United States Patent [19]

Prudhon et al.

[11] 4,152,543

[45] May 1, 1979

[54] INSTALLATION FOR TIME MULTIPLEXING AND TRANSMITTING TELEPHONE SIGNALS OR DATA BETWEEN A PLURALITY OF SUBSCRIBERS

[75] Inventors: Lucien P. E. Prudhon, Soisy-sur-Seine; Jean P. G. Charil, Clamart, both of France

[73] Assignee: Association des Ouvriers en Instruments de Precision, Paris, France

[21] Appl. No.: 749,620

[22] Filed: Dec. 13, 1976

[30] Foreign Application Priority Data

Dec. 15, 1975 [FR] France .............................. 75 38274

[51] Int. Cl.² .............................................. H04J 3/04
[52] U.S. Cl. .................................................. 179/15 A
[58] Field of Search ............ 179/15 A, 15 BL, 15 BF, 179/18 BC, 15 AA, 15 AP, 15 AQ

[56] References Cited

U.S. PATENT DOCUMENTS

| | | | |
|---|---|---|---|
| 3,427,475 | 2/1969 | Wilkenson | 179/15 BL |
| 3,624,304 | 11/1971 | Formenti | 179/15 AA |
| 3,683,115 | 8/1972 | Schellenberg | 179/15 BF |
| 3,787,628 | 1/1974 | Van Dijk | 179/15 BF |
| 3,922,493 | 11/1975 | Brenig | 179/15 AP |
| 4,009,348 | 2/1977 | Tate | 179/15 BF |
| 4,017,687 | 4/1977 | Hartzler | 179/15 A |
| 4,021,618 | 5/1977 | Wurst | 179/18 FC |

*Primary Examiner*—David L. Stewart
*Attorney, Agent, or Firm*—Cooper, Dunham, Clark, Griffin & Moran

[57] ABSTRACT

An installation for transmitting telephone signals or data with time multiplexing for a plurality of subscriber sets divided into a number of groups. At least one pair of multiplexing gates actuated in synchronism are employed for each group, one for transmission and the other for reception. There is included at least one time multiplex connection, and at least one pair of first supplementary gates, respectively inserted between the multiplex connection and the transmission and reception gates connected to the subscriber sets in each single group. The first supplementary gates are actuated in synchronism with the corresponding transmission and reception gates. In the event of a fault in the transmission gate or reception gate connected to a subscriber set, the corresponding first supplementary gate is kept closed for the duration of the fault, thereby isolating the group; the remainder of the system is permitted to operate.

1 Claim, 7 Drawing Figures

Fig. 4

INSTALLATION FOR TIME MULTIPLEXING AND TRANSMITTING TELEPHONE SIGNALS OR DATA BETWEEN A PLURALITY OF SUBSCRIBERS

The invention relates to an installation for time multiplexing and transmitting telephone signals or data between a plurality of subscribers.

There are various known kinds of installations for time multiplexing and transmitting telephone signals between a plurality of said installations, comprising, for each subscriber, at least one pair of multiplexing gates which are actuated in synchronism, one gate for transmission and the other for reception of signals by the subscriber, and are connected by at least one time multiplex link to other similar installations.

In the known transmission installations, the telephone signals or data to be transmitted are first periodically sampled, and the successive samples of the signals transmitted by the different subscribers are time-multiplexed in known manner. In installations in which the amplitude-modulated samples themselves are transmitted by the time multiplex link, the signals transmitted by each subscriber are sampled by the transmission multiplexing gate assigned to the respective subscriber. However, in most of the known installations, time multiplex transmission is used not for the amplitude-modulated samples themselves but for groups of digital signals deduced form the respective samples by means of an analog/digital coder. In the case of the latter installations, which are called "pulse code modulation" (P.C.M.), a coder/decoder pair can be associated with each subscriber or with all the subscribers in common; in the first case, the multiplexing gates for transmission and reception respectively, which are associated with each subscriber, are connected downstream of the corresponding coder/decoder pair, the multiplexing gates being of the logic kind and adapted for processing digital signals; in the second case, on the other hand, the multiplexing gates precede the coder/decoder pair common to all the subscribers, and must be of the analog kind, adapted to processing amplitude-modulated samples.

In all the aforementioned known kinds of installations for transmitting telephone signals or data to multiple subscribers with time multiplexing, a fault in a single multiplexing gate associated with a subscriber may incapacitate the entire transmission installation, inter alia if the faulty gate remains blocked in the open or conducting position (or in the closed position in the case of an electromechanical contact). The reason is that, irrespective of the nature of the aforementioned transmission installation in question, the faulty gate, which is locked in the open position, permanently applies a given d.c. potential to the outputs of all the other corresponding multiplexing gates, i.e. for transmission or reception, which are connected in parallel with the output of the faulty gate to the time multiplex connection, possibly via the common coder or decoder for all the subscribers. Of course, the entire transmission installation remains out of order until the fault in the multiplexing gate locked in the open position has been corrected, e.g. by replacing the corresponding component or integrated circuit.

The installation according to the invention for transmitting telephone signals or data to multiple subscribers with time multiplexing also comprises, for each subscriber, at least one pair of multiplexing gates actuated in synchronism, one for transmission and the other for reception of signals by the subscriber, the gates being connected by at least one time multiplex connection to other similar installations; however, the installation according to the invention does not have the previously mentioned serious disadvantage of prior art installations of the same kind.

The installation for transmitting telephone signals or data according to the invention is of the previously described kind, and is characterised in that the subscribers are divided into a number of groups, the pairs of transmission and reception gates for the subscribers of one group being connected in parallel to at least one pair of first supplementary gates, which are respectively inserted between the pairs of transmission and reception gates and the multiplex connection, and are actuated in synchronism with the corresponding transmission and reception gates, and means are provided whereby, in the event of a fault in the transmission or reception gate of a subscriber, the corresponding first supplementary gate of the group including the subscriber is kept closed.

Owing to the last-mentioned feature, if a fault occurs in a subscriber's transmission or reception gate, it affects only that part of the installation corresponding to the group including the subscriber, whereas the subscribers in all the other groups can still reach or be reached by a subscriber to another installation of the same kind, via the time multiplex connection.

As previously stated, the invention is applicable inter alia to a telephone signal or data transmission system of the P.C.M. kind, in which a coder/decoder pair is allocated to all the subscribers in common. In the case, however, where the coder and decoder respectively have a single input and output, there is an additional problem of providing access to the single input or output for the first supplementary gates which, according to the invention, are associated with the different groups of subscribers respectively. To this end, according to another feature of the invention, the first supplementary gates of the different groups of subscribers are connected in parallel to the single input or output of the coder or decoder via second supplementary gates which are respectively actuated in synchronism with the transmission and reception gates of the different subscribers to the corresponding groups.

Similarly, in the case of P.C.M. transmission installations comprising a single coder/decoder pair terminating at a single time multiplex connection, a fault in or overloading of the coder or decoder is sufficient to prevent all the subscribers to the installation from reaching or being reached by a subscriber to a second installation via the time multiplex connection. Consequently, in the event of a fault in the single coder or decoder, the complete installation will be out of action. This disadvantage can be obviated by inserting a number (inter alia at least a first and a second) of coder/decoder pairs between (a) the pairs of transmission and reception gates of the different subscribers and (b) at least two multiplex connections, so that the coder/decoder pairs operate in common on behalf of all the subscribers. In the case, however of an installation according to the invention, the problem still arises of providing access for all subscribers to one or the other of the multiplex connections via the corresponding coder/decoder pair, in the event of a fault in or overloading of one of the coders or decoders. According to another feature, the latter problem can be solved by connecting the pairs of transmission and reception gates of the subscribers in a single group in parallel to at least a first and a second pair of first supplementary gates, which are respectively inserted between (a) the pairs of transmission and reception gates, and (b) the first and second coder/decoder pair, only one of the two pairs of first supplementary gates being actuated in synchronism with the corresponding transmission and reception gates. In this manner the central components of the installation according to the invention automatically "choose" to actuate only that pair of first supplementary gates which enables a subscriber to reach or be reached by that one of the coders or decoders which is certainly available, in the event of a fault or overloading of the other coder or decoder.

This feature not only increases the reliability of a P.C.M. installation according to the invention but also increases its traffic capacity, resulting in a higher proportion of connections made and calls transmitted.

In the case of a P.C.M. installation according to the invention, connections between any two subscribers in the same installation, whether belonging to the same group or not, can be made by using the following advantageous feature: the output of each coder is directly connected to the input of the associated decoder by a connection in which at least one gate is inserted, the gate being actuatable in synchronism with the transmission gate of a first subscriber and the reception gate of a second subscriber. If the installation comprises a single coder/decoder pair, different time channels must of course be used for (a) transmitting signals from the first to the second subscriber and (b) transmitting signals from the second to the first subscriber. If on the other hand the installation comprises at least two coder/decoder pairs, the same time channel can be used for transmitting signals in both directions, provided that the first coder/decoder pair is used for one direction and the second coder/decoder pair for the other direction.

By way of example, a number of embodiments of a system for transmitting telephone signals according to the invention are described hereinafter and diagrammatically illustrated in the accompanying drawings, in which.

Figure 1:
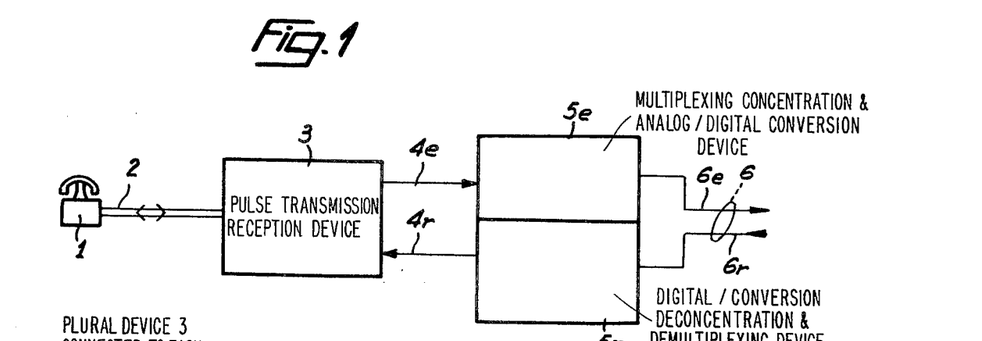
FIG. 1 is a block diagram of an installation for transmitting telephone signals with time multiplexing.

In FIG. 1, 1 denotes one of the multiple subscriber sets in a time-multiplex telephone-signal transmission installation; each set such as 1 is connected by a telephone line 2 (usually two-wire) to a telephone pulse transmission and reception device 3, which can e.g. be of the kind described in U.S. Appln. Ser. No. 516,575 filed by the present Applicants on Oct. 21, 1974 for "A device for transmitting and receiving telephone pulses". The other two terminals of device 3 are connected by two two-wire lines 4e, 4r respectively to the input of a multiplexing, concentration and analog/digital conversion device 5e and the output of a digital/conversion, deconcentration and demultiplexing device 5r. The installation in question is connected to one or more other installations of the same kind by at least one time multiplex connection diagrammatically indicated by a line 6, comprising a transmission conductor 6e connected to the output of device 5e and a receiving conductor 6r connected to the input of device 5r.

Figure 2:
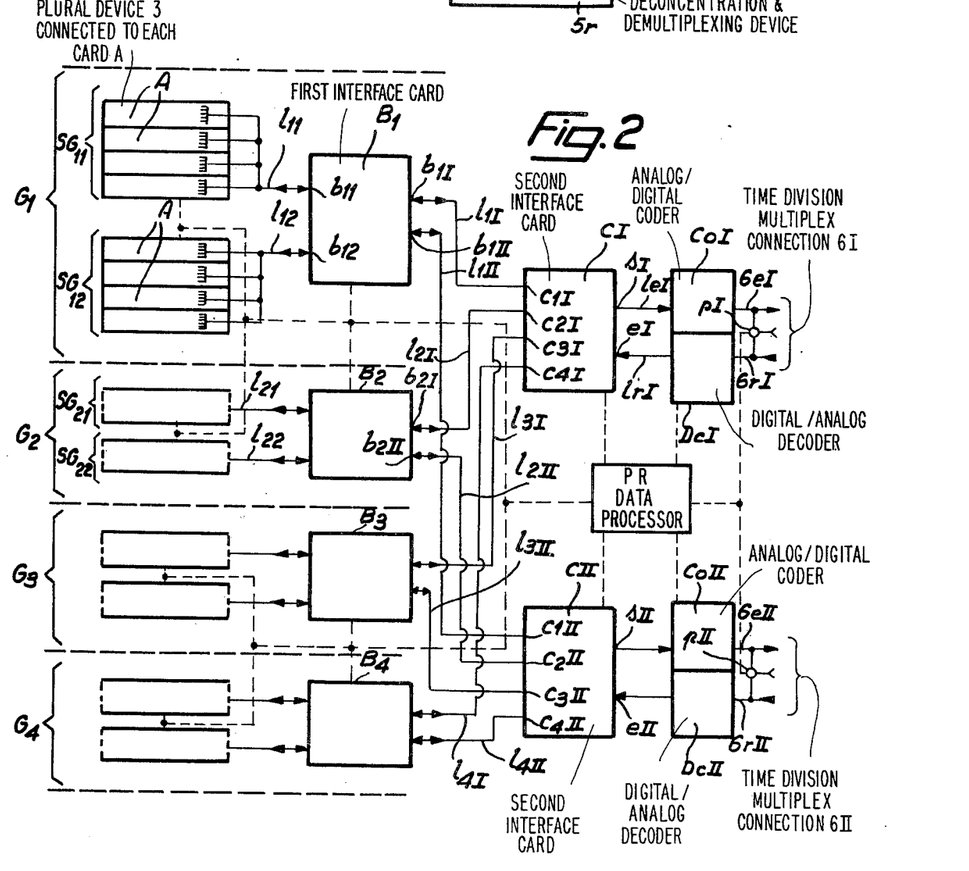
FIG. 2 is a general diagram of an embodiment of a telephone-signal transmission installation according to the invention.
Figure 3:
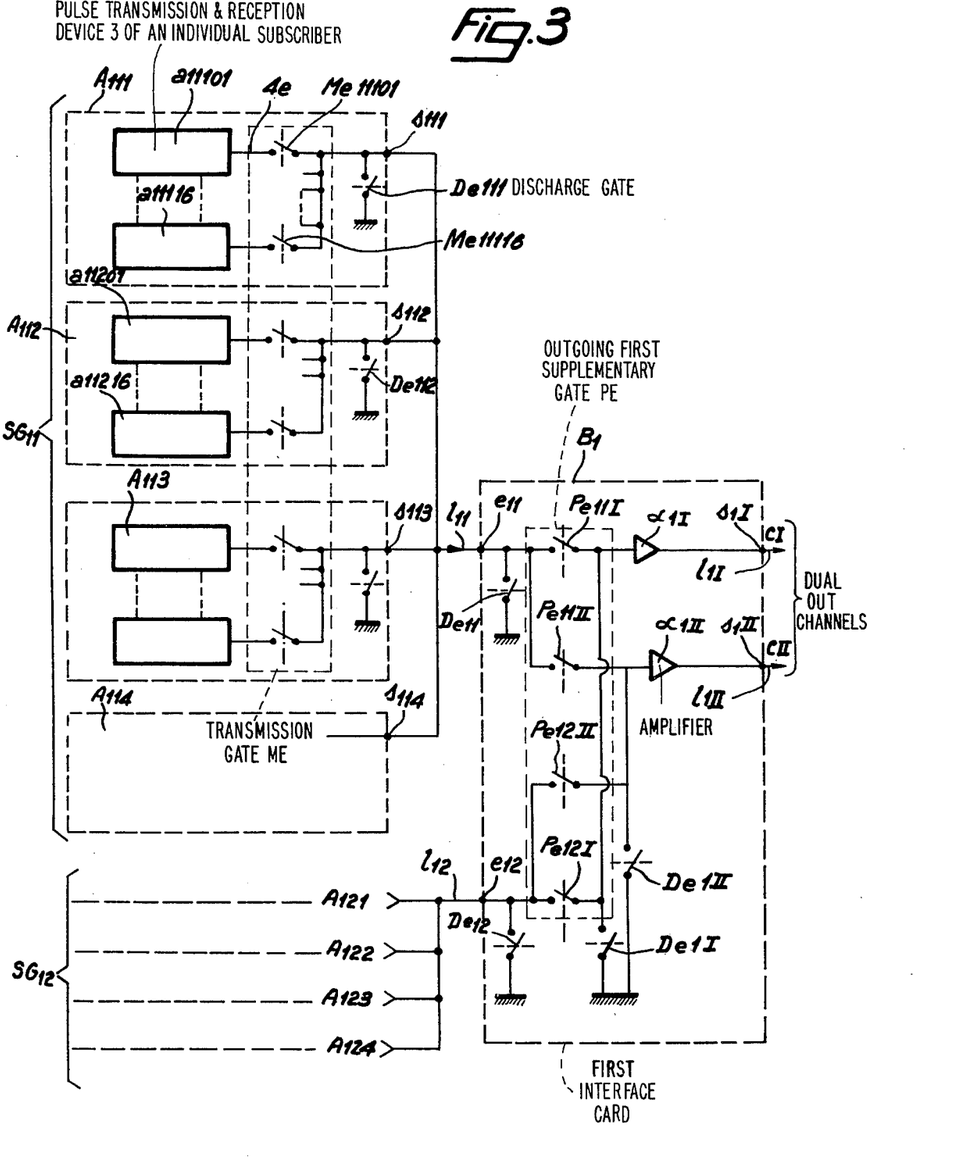
FIGS. 3 and 4 respectively show two parts of the telephone-signal transmission network in the installation in FIG. 2.
Figure 4:
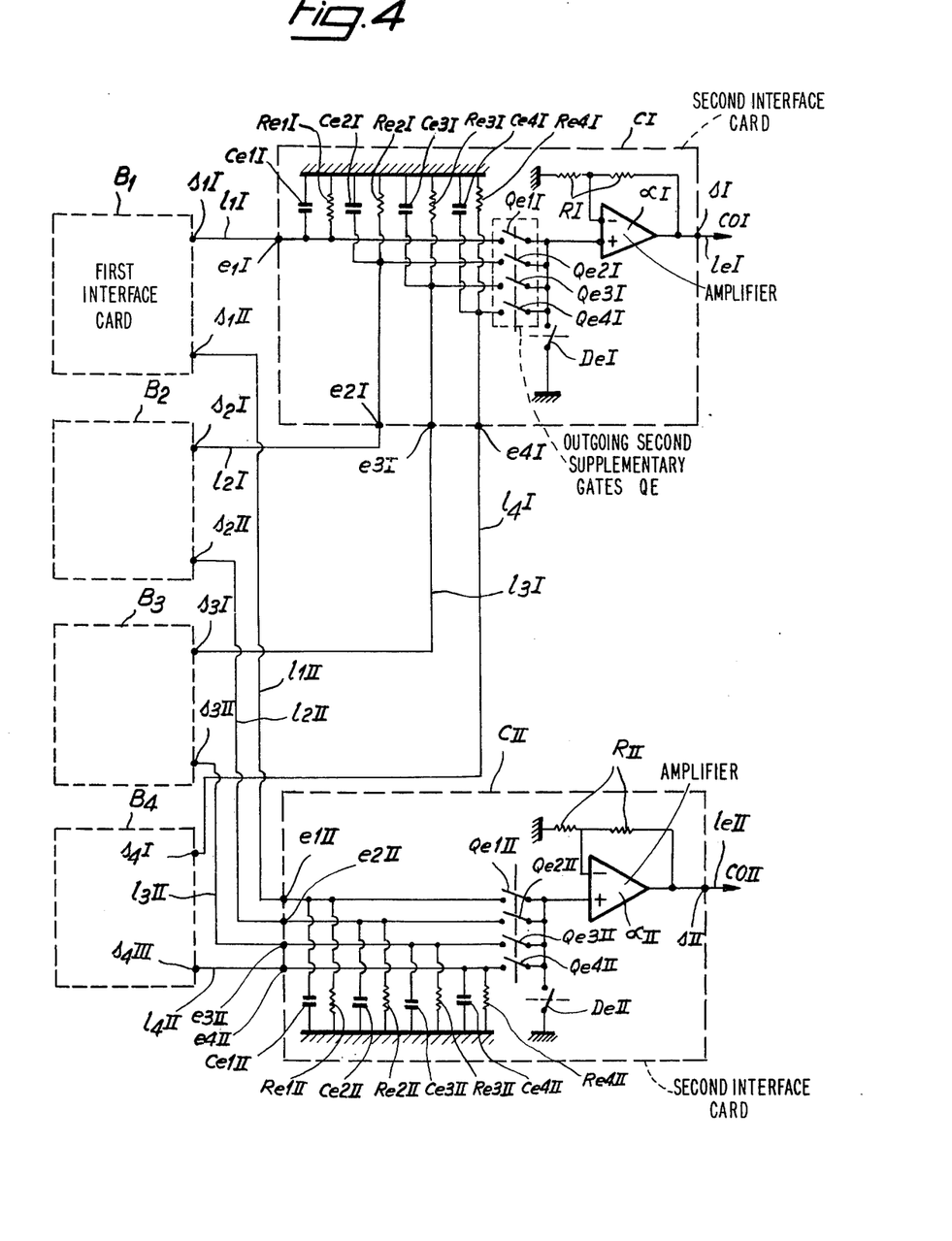
Figures 5, 7:
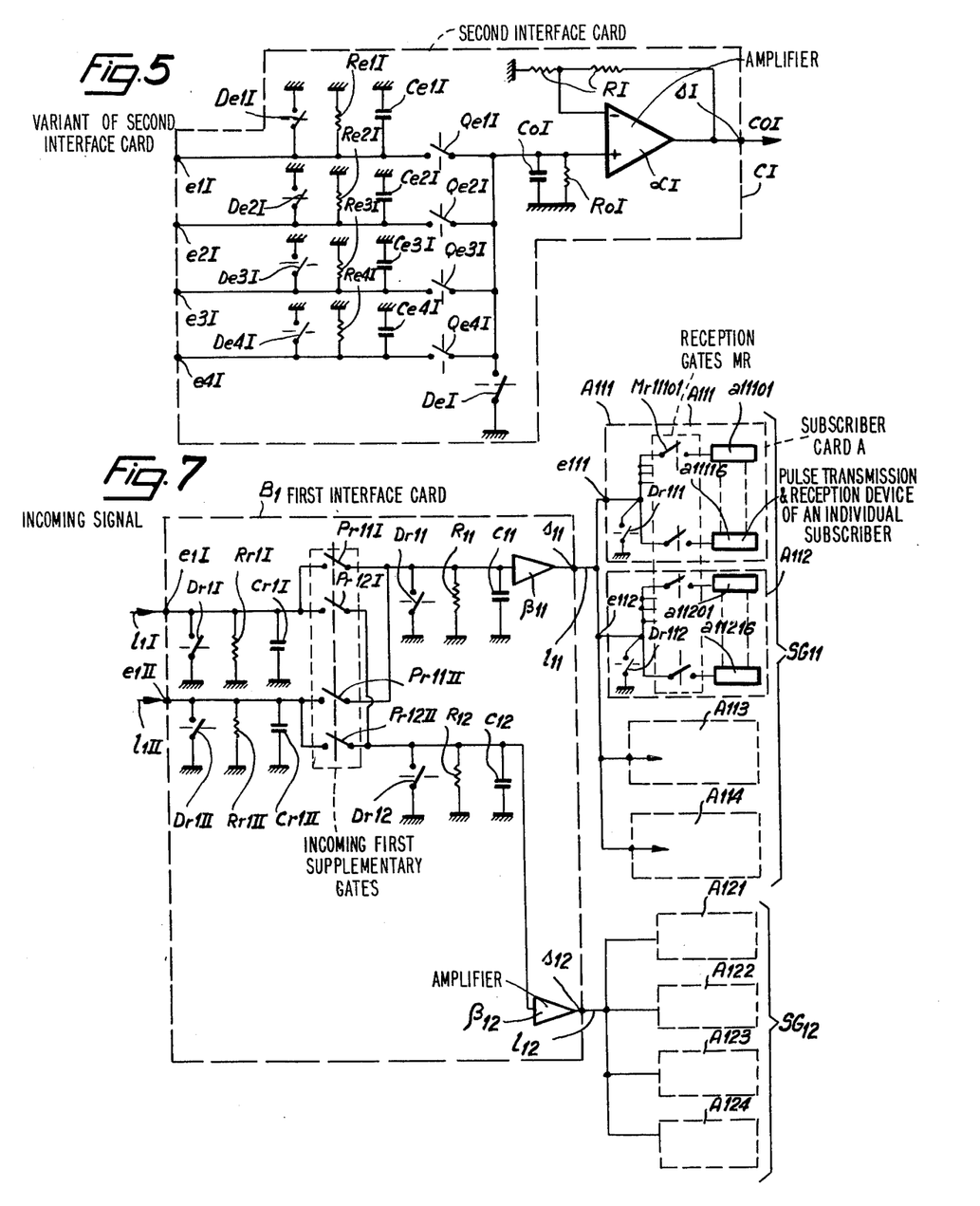
FIG. 5 represents a variant of a part of FIG. 4.
FIGS. 6 and 7 show two parts of the telephone signal reception network of the installation according to the invention.

In FIG. 1, and similarly in FIGS. 3 and 7, a distinction is made between the transmission device 5e and the receiving device 5r, whereas in FIG. 2, which is a general view of an embodiment of the invention, blocks represent sets of components or circuits each used simultaneously for transmission and transmission of telephone signals, as is the case incidentally with the device 3 in FIG. 1. Incidentally, the diagram in FIG. 2 corresponds to the real spatial distibution of the different assemblies and sub-assemblies of the installation, whereas FIGS. 3-7 show only individual circuits, which have been deliberately selected to explain the operation of the invention.

In FIG. 2, each block A symbolises a card to which 16 telephone pulse transmission and reception devices are secured, respectively corresponding to 16 different subscribers to the installation in question. One such device is denoted by 3 in FIG. 1. Four cards A form a sub-group such as SG 11, the terminals of which are connected in parallel to a bidirectional time-multiplex line such as 1II. Two sub-groups of cards A such as SG 11 and SG 12 form a first group G1, in which multiple lines 1II and 1I2 are respectively connected to the two distinct primary terminals b11, b12 of a first interface card B1 which also has two distinct secondary terminals b1I and b1II. Similar first interface cards B2, B3 and B4 are allocated to the other three groups G2, G3 and G4 each made up to two sub-groups of four cards A each corresponding to 16 subscribers. Thus, each group such as G1 corresponds to 128 subscribers, i.e. a total of 512 subscribers to the entire installation.

Bidirectional multiplex 1II to 14I connect the secondary terminals b1I to b1IV of the first interface cards B1 and B4 respectively to the primary terminals C1I to C4I of a second interface card C1; similarly bidirectional multiplex lines 1III to 14II connect the secondary terminals b1II to b4II of the first interface cards B1 to B4 to the first terminals c1II to c4II of another second interface card CII. Each second interface card CI and CII has two secondary terminals, e.g. a transmission output SI connected by a unidirectional multiplex line IeI to the input of an analog/digital coder CoI, and a receiving input eI connected by a unidirectional multiplex line IrI to the output of a digital/analog decoder DcI; as shown in FIG. 2, the outputs of coders CoI and CoII are respectively connected to two transmission conductors 6eI and 6eII of two mutually independent time-multiplex bidirectional connections having respective receiving conductors 6rI and 6rII connected to the respective inputs of decoders DcI and DcII.

As can be seen, the first interface cards B1 to B4 and the second interface cards CI and CII form part of the two devices denoted by 5e and 5r respectively in FIG. 1. The two time multiplex bidirectional lines 6I and 6II (FIG. 2) preferably connect the installation illustrated in FIG. 2 in parallel to one or more other installations of the same kind (not shown).

We shall now, with reference to FIGS. 3-7, describe the construction of the subscriber cards A, the first interface cards B1 to B4 and the second interface cards CI an CII.

At the left of FIG. 3, rectangles in chain lines denote the four subscriber cards A111 to A114 which make up the sub-group SG 11 (FIG. 2); on each subscriber card (e.g. A111) a continuous-line rectangle denotes the transmission and reception device of each of the 16 subscribers to whom the card in question is allocated (the reference is to the transmission and receiving device denoted by 3 in FIG. 1). For example, card A111 bears subscriber devices a11101 to a11116. Each subscriber device, e.g. a11101, produces an analog electric voltage on its two-wire output line denoted by 4b (as in FIG. 1), and the voltage is applied to the input of a transmission multiplexing gate Me11101. The gate in question is an analog gate, which can comprise a solid component such as an MOS type transistor, or a logic circuit, preferably integrated. A gate of this kind has been diagrammatically indicated by the symbol for an electric contact, closure of which corresponds to opening the corresponding gate. The control means for each gate such as Me11101 is symbolically indicated by a broken line through the electric contact symbol. A receiving multiplexing gate, e.g. Mr11101 (see the right part of FIG. 7) is associated with a transmission multiplexing gate, e.g. Me11101, associated with a subscriber to the installation. When a first subscriber to the installation in question tries to make, or has made, a connection to a second subscriber on a different installation of the same kind, via a time multiplex connection, the two transmission and reception gates allocated to the first subscriber (e.g. Me11101 and Mr11101) are simultaneously actuated, i.e. the central components of the installation in question, which have not been shown but the design of which is well known, simultaneously open the transmission and reception gates of the subscriber for short periods, with a repetition period of e.g. 125 microseconds; the brief, periodic opening of the transmission gate such as Me11101 is used for sampling the analog telephone signal appearing at the output line 4e with a frequency of 8,000 Hz. The times during which the transmission gate, e.g. Me11101, are open are chosen by the aforementioned central components so as to be in one of the time channels provided for the two multiplex connections (6I and 6II in FIG. 2), with the result that the transmission gates, besides sampling the telephone signals simultaneously transmitted by a number of subscribers to the installation, also multiplex the sampling signals, which are amplitude-modulated pulses.

The outputs of all the transmission gates of a single subscriber card, e.g. A111, inter alia the outputs of gates Me11101 and Me11116, are connected in parallel to a single output s111 which is also connected to a discharge gate De111, i.e. an analog gate inserted between earth and a common output s111 and opened by the aforementioned central means whenever all the transmission gates Me11101 to Me11116 are all closed, so that the interfering capacitances of the different components of the subscriber card A111 are discharged to earth. Discharge gates such as De112 are respectively associated with the other subscriber cards.

The outputs s111 to s114 of the different subscriber cards A111 to A114 are connected in parallel to the transmission conductor of the time-multiplex line l11 (FIG. 2) which in turn is connected to the input e11 of the first interface card B1 (input e11 forms part of the primary access to card b1, denoted by b11 in FIG. 2). Similarly, the outputs of the four subscriber cards of sub-group SG 12 (not shown in FIG. 3) are connected in parallel to the transmission conductor of the multiplex line l12, which in turn is connected to the e12 input of the first interface card B1.

The first interface card B1 substantially comprises two amplifiers $\alpha 1I$ and $\alpha 1II$, preferably having a high input impedance and a low output impedance and having their respective outputs connected to two distinct outputs s1I and s1II of card B1, which also comprises four first supplementary analog gates Pe11I and Pe11II, inserted respectively between input e11 of card B1 and the inputs of amplifiers $\alpha 1I$ and $\alpha 1II$, and Pe12I and Pe12II, respectively inserted between input e12 of card B1 and the inputs of amplifier $\alpha 1I$ and $\alpha 1II$. These four first supplementary gates disposed on the first interface card B1 are also controlled by the central means (not shown of the installation according to the invention, each in synchronism with the multiplexing gates of some subscribers to the installation who are trying to make or have made a connection to a subscriber to another installation via one of the multiplex connections. Discharge gates De11 and De12 on the one hand and De1I and De1II on the other hand are connected upstream and downstream respectively of the first supplementary gates Pe11I to Pe12II. The discharge gates are actuated so as to be open when the first supplementary gates connected thereto are closed; consequently discharge gate De11, for example, is open at the same time as discharge gate De111 to De114, which accelerates the discharge of the corresponding lines.

As FIG. 4 shows, outputs s1I to s4I of the first interface cards B1 to B4 on the one hand, and their outputs S1II to s4II on the other hand, are respectively connected to the four inputs e1I to e4I on the one hand and e1II to e4II on the other hand of the two second interface cards CI and CII, via the transmission conductors of the multiplex lines l1I to l4I on the one hand and l1II to l4II on the other hand. The two second interface cards CI and CII have differential amplifiers $\alpha I$ and $\alpha II$ respectively, whose outputs are directly connected to the sI and sII outputs of a second interface cards; in the embodiment in question, the subtractive input of each differential amplifier $\alpha I$ and $\alpha II$ is connected to the intermediate point of a voltage divider connected between earth and the output of the corresponding amplifier and made up of two resistors RI and RII, the values of which can be chosen to adjust the gain of the corresponding differential amplifier $\alpha I$ or $\alpha II$ so as to provide proper adaptation between (a) the input of coder CoI or CoII (see also FIG. 2) which is connected to the output sI or sII of the corresponding second interface card, and (b) the different lines connected to the additive input of the differential amplifier in question. Each second interface card also comprises matching resistors and capacitors, e.g. Re1I to Re4I and Ce1I to Ce4I, respectively connected between earth and inputs e1I to e4I of card CI, and second supplementary gates Qe1I to Qe4I, respectively inserted between inputs e1I to e4I of card CI and the additive input of the differential amplifier $\alpha I$. The second supplementary gates Qe1I to Qe4I are also controlled by the central components of the installation so as to be open at the same time as some of the first supplementary gates of the first interface cards B1 to B4, i.e. at the same time as the transmission gates of certain subscribers to the installation. Discharge gates DeI and DeII are likewise provided on the second interface cards CI and CII, the discharge gates being connected downstream of the second supplementary gates of the corresponding card. Of course, the discharge gates DI and DII respectively are open when the corresponding second supplementary gates are closed. Preferably, also, amplifiers αI and αII have a high input impedance and a low output impedance.

FIG. 5 shows a variant embodiment of the second interface cards, inter alia card CI: this variant does not differ from the embodiment in FIG. 4 except in the following details: Capacitors Ce1I to Ce4I are connected in parallel to resistors Re1I to Re4I for matching the different input e1I to e4I of card CI; capacitors Ce1I to Ce4I discharge to earth the high-frequency noise components received along the different lines. Discharge gates De1I to De4I are connected in parallel between earth and the respective inputs e1I to e4I of card CI; the discharge gates, which remain open as long as the corresponding second supplementary gates Qe1I to Qe4I are closed, also prevent the transmission of noise downstream of the second interface card. Finally, a resistor RoI and a capacitor CoI are inserted between earth and the outputs of the second supplementary gates Qe1I to Qe4I, which are connected to the additive input of the differential amplifier αI, the value of resistor RoI being chosen so as to reduce the effect of leakage currents from gates Qe1I to Qe4I and from differential amplifier αI.

The previously-described features illustrated in FIG. 5, the main object of which is to improve the signal-to-noise ratio at the second interface cards, may also be applied to the first interface cards B1 to B4. The embodiment of the latter illustrated in FIG. 3 can also be improved as follows: In order to improve the matching of the outputs s1I and s1III of each card such as B1 and reduce the effect of the capacitances of the different connecting lines on amplifiers α1I and α1III, resistors of suitable value can be inserted between the outputs of the amplifiers and the outputs s1I and s1III of the card B1 in question.

Figure 6:
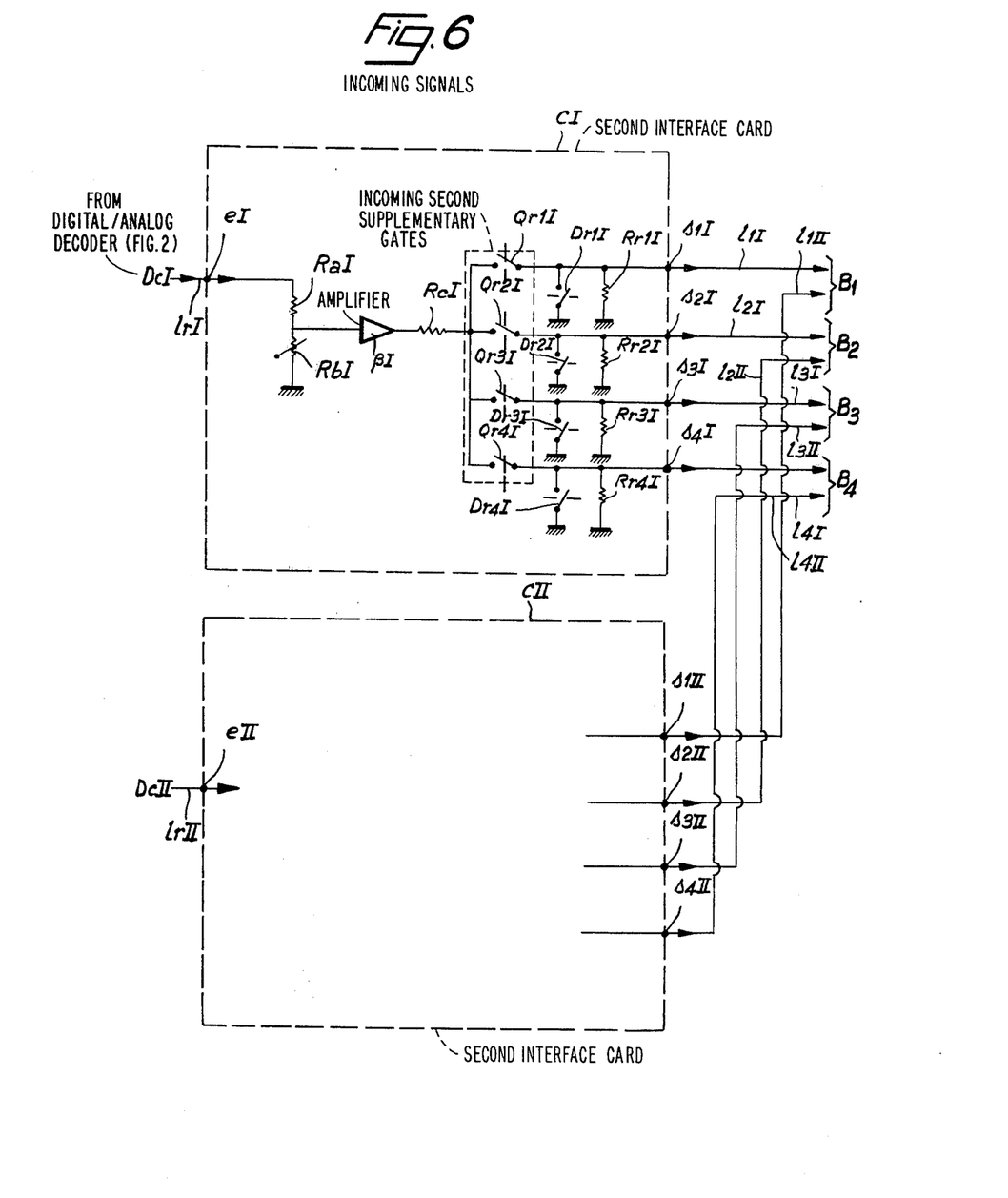

FIG. 6 is a diagram of part of the two second interface cards CI and CII, and FIG. 7 shows one of the four first interface cards, inter alia B1, the cards being limited to those elements which are inserted in the deconcentration network, which forms part of device 5r in FIG. 1.

As shown in FIG. 6, each of the two second interface cards, e.g. CI, has an input eI, which is connected to the output of decoder DcI (FIG. 2) may a multiplex line IrI. Card CI comprises an amplifier βI whose input is connected to the intermediate point of a voltage divider RaI - RbI inserted between earth and input eI. One of the two resistors constituting the voltage divider, e.g. RbI, is variable so as to adjust the voltage received by the input of amplifier βI from the output of decoder DcI. A matching resistance RcI is inserted between the output of amplifier βI and the inputs, connected in parallel with one another, of the second supplementary analog reception gates Qr1I to Qr4I respectively connected to matching resistors Rr1I to Rr4I and discharge gates Dr1I to Dr4I, which are not open except when the corresponding second supplementary gates Qr1I to Qr4I are closed. The outputs of the second supplementary reception gates are respectively connected to the four outputs s1I to s4I of the second interface card, inter alia CI. At least some of the second supplementary reception gates are open in synchronism with the reception multiplexing gates of those subscribers to whom a connection has previously been made. The second supplementary receiving gates are likewise analog gates.

Preferably, amplifier βI also has a high input impedance and a low output resistance. Capacitors may also be connected in parallel with matching resistors Rr1I to Rr4I, in order to divert to earth the high-frequency components capable of interfering with the operation of the installation.

As FIG. 7 shows, the respective outputs s1I and s1III of the two second interface cards CI and CII are respectively connected to the inputs e1I and e1III of the first interface card B1, which are respectively connected in parallel to resistors Rr1I and Rr1III and matching capacitors Cr1I and Cr1III and to discharge gates Dr1I and Dr1III. In addition, outputs s11 and s12 of the first interface card B1 are connected to the outputs of two amplifiers β11 and β12, preferably having a high input impedance and a low output impedance; the inputs of amplifiers β11 and β12 are respectively connected to matching resistors R11 and R12 and capacitors C11, C12 and to discharge gates Dr11 and Dr12. Four first supplementary receiving gates Pr11I to Pr12II are inserted between the outputs e1I and e1III of the first interface card B1 and its outputs s11 and s12; as before, the gates are analog gates, at least some of which are actuated by the central components of the installation in synchronism with the reception multiplexing gates of those subscribers who are using already-made connections. All the discharge gates Dr1I Dr1III, Dr11 and Dr12 are normally open; they are closed only when the first reception supplementary gates Pr11I to Pr12II, are open, the last-mentioned gates being connected to the discharge gates. Capacitors Cr1I, Cr1III, C11 and C12 divert to earth a high-frequency component which might interface with operation of the installation.

The reception conductors of the bidirectional multiplex lines l11 and l12 respectively connect the outputs s11 and s12 of the first interface card B1 to the inputs, e.g. e111, e112, etc., of the subscriber cards A111 to A124, which respectively make up the two sub-groups SG11 and SG12. The input, e.g. e111, of each subscriber card such as A111, is connected to a discharge gate Dr111; it is also connected in parallel to the inputs of all the reception multiplexing gates such as Mr11101, whose outputs in turn are connected to the two-wire inputs of the devices a11101 to a11116 respectively allocated to 16 different subscribers. One of these devices is denoted by reference 3 in FIG. 1.

We shall now, with reference to FIGS. 3, 4, 6 and 7 describe the paths followed by a connection between a first subscriber, belonging to the installation in question, and a second subscriber, belonging to another installation of the same kind, the two installations being connected in parallel by the two time-multiplexing bi-directional connections 6eI-6rI and 6eII-6rII (FIG. 2). If the first subscriber (i.e. to the installation in question) corresponds to device a11101 in card A111 (FIG. 3), i.e. is a subscriber in sub-group SG11 in group G1, the analog telephone signals which he transmits are sampled on the transmission line 4e by periodic opening of the transmission multiplexing gate Me11101, which also allocates the thus-produced samples to that one of the time channels (in one of the two aforementioned multiplex lines) which the central components allocated to the connection in question when it was made. As a result of the closing of discharge gates De111 to De114 and De11 in synchronism with the opening of the transmission multiplexing gate Me11101, each telephone signal sample is transmitted by a transmission conductor of multiplex line l11 to input e11 of the first interface card B1. If a channel of the multiplex connection 6eI-6rI has been allocated to the communication in question, the first supplementary transmission gate Pe11I and the second supplementary transmission gate Qe1I are also open in synchronism with a transmission multiplexing gate Me11101, so that each telephone signal sample, after crossing amplifier αlI of the first interface card B1, arrives via the transmission conductor of multiplex line 1lI at the input e1I of the second interface card CI, and is then transmitted to the additive input of its amplifier αI, which then transmits it to the input of the analog/-digital coder CoI. Thereupon the series of digital signals, inter alia calibrated pulses, appears at the input of coder CoI and corresponds to the numerical value nearest to the amplitude of the telephone signal sample received by coder CoI; the digital signals are sent to the other installation (not shown) by the transmission conductor 6eI (FIG. 2) of the selected multiplex connection. Each telephone signal sample transmitted by the second subscriber appears simultaneously in the form of digital signals on the reception conductor of the same multiplex line 6rI, at the input of decoder DcI. The decoder output transmits a pulse (the amplitude of which corresponds to the digital value of the sample received via the coder input) to input eI of the first interface card CI (FIG. 6). Since the first and second supplementary reception gates Pr11I and Qr1I respectively are open in synchronism with the reception multiplexing gate Mr11101 (FIG. 7) allocated to the first subscriber, at the same time as the discharge gates Dr1I, Dr1I and Dr111 to Dr114 are closed, the received telephone signal is transmitted, via amplifier βI, to the output s1I of the second interface card CI, and thence to the input e1I of the first interface card B1 and on, via the corresponding amplifier β1I, to the output s1I of card B1. The same received telephone signal sample is then transmitted by the reception conductor of multiplex line 1lI to input e1II of the subscriber card A111, and then, as a result of opening the reception multiplex gate Mr11101, to the input of the subscriber device a11101; the latter converts a successive sample of received telephone signals into an analog signal which, after amplification, is transmitted to the earphone of the first subscriber set.

If, for any reason, during or outside a connection, the transmission multiplexing gate Me11101 of the first subscriber (considered by way of example) is permanently blocked in the open position, the telephone signals appearing on the transmission line 4e and coming from device a11101 are no longer sampled but permanently transmitted to the transmission conductor of lII where they are superposed, if required, on the telephone signal samples transmitted to the same conductor from other subscribers to the same sub-group SG11. According to the invention, means are preferably provided which, in the event of the last-mentioned fault, keep the corresponding first supplementary gates Pe11I and Pe11II closed, to prevent the fault from being transmitted to the outputs S1I and s1II of the first interface card B1 and the subsequent units of the installation. The result, clearly, is to inactivate all the subscriber sets in sub-group SG11, at least as regards the transmission of signals, but an important advantage is obtained in that all the other subscribers to the installation, i.e. those of sub-group SG12 and all those of the other groups G2 to G4, are not affected by the fault in the single first subscriber set; this is clear in the case of the subscribers in the other groups, since their connections, if any, do not pass through the first interface card B1; with regard to the subscribers in sub-group SG12, it can be seen that their connections, transmitted to input e12 of the first card B1, can reach the corresponding outputs s1I and s1II without being interfered with, as a result of the closure of the first supplementary gates Pe11I and Pe11II. In the event of a fault in a subscriber's reception multiplexing gate, e.g. Mr11101, the subscriber would not only receive all connections intended for sub-group SG11, but loops would also form and interface with operation of the other sets in the same sub-group SG11. This is avoided by keeping the first supplementary reception gates Pr11I and Pr11II permanently closed, thus inoperating the sub-group SG1 as far as reception is concerned, while continuing to serve the other sub-groups and groups. If, in the case previously considered by way of example (i.e. a connection between the first and second subscriber via the multiplex connection 6eI–6rI), coder C1I becomes inoperative, appropriate well-known means (shown in FIG. 2 as data processor PR and interconnected any communicating with the other components of the system as shown by the dashed lines) provided for the purpose in the central control unit of the installation automatically decide to keep the second supplementary transmission gates Qe1I to Qe4I (FIG. 4) permanently closed, and to actuate the first supplementary transmission gate Pe11II and the second supplementary transmission gate Qe1II in synchronism with the transmission multiplexing gate Me111 so that the telephone signal samples transmitted thereby reach the input of coder CoII and are then transmitted, after digitalization, to the other installation by the transmission conductor 6eII of the second multiplex connection. Switching operations of the same kind can be made if one of the decoders DcI or DcII falls out of use. Of course, when a connection is made, the central components may choose to send the required connection through either of the two time-multiplexing connections, depending on the momentary load on each one of them. Thus, in the case of a given total number of subscribers, the capacity of the installation, i.e. the proportion of connections made and calls transmitted, can be increased by having more than two coder/decoder pairs and time-multiplex bidirectional connections. However, the invention is also applicable to installations of the kind in question, each of which comprises a single coder/decoder pair connected to other similar installations by a single time-multiplex bidirectional connection.

The previously-described embodiment of the installation according to the invention comprises coders having a single input and decoders having a single output, necessitating concentration and deconcentration networks borne by the second interface cards CI and CII. Such networks, of course, are unnecessary if there are coders and decoders having a number of inputs and outputs at least equal to the number of subscriber groups G1 to G4.

Similarly, the second interface cards CI and CII are unnecessary in the case of an installation comprising a coder/decoder pair associated with each subscriber and consequently disposed on the corresponding subscriber card; in that case, the transmission and receiving multiplexing gates, e.g. Me11101 and Mr11101, can be digital gates disposed respectively at the coder output and at the decoder input of the subscriber in question. Likewise, the second interface cards CI and CII are unnecessary in the case of an installation for transmitting telephone signals or data in the form of amplitude-modulated pulses obtained by sampling without digitalization.

The right side of FIG. 2 shows a direct connection between the output of each coder CoI and CoII and the input of the corresponding decoder DcI or DcII. A gate bI or bII is inserted in the connection and can be actuated by the central components of the installation in synchronism with the transmitting gate of a first subscriber to the installation. The reception gate of a second subscriber to the same installation is inserted in the same connection. These features can be used to make direct connections between two subscribers to the same installation. Similar connections may be made between the transmission wires 6eI and 6eII of the two time-multiplex connections and the corresponding reception wires 6rII and 6rI, so that internal connections of this kind can take paths extending respectively through a coder and a decoder not associated with the same time multiplex connection.

In the embodiment illustrated in FIG. 2, the same time channel can be allocated to two routes in opposite directions, thus making an internal connection, but one route must pass through the coder/decoder pair CoI - DcI and the other route must pass through the coder/decoder pair CoII - DcII. The two routes can extend through the same coder/decoder pairs, provided that they are allocated distinct time channels; this is necessary in the case of an installation comprising a single coder/decoder pair, as previously mentioned.

We claim:

1. An installation for transmitting telephone signals or data with time division multiplexing, comprising a plurality of subscriber sets arranged in a number of groups, a plurality of pairs of multiplexing gates actuated in synchronism, each pair comprising a transmission gate and a reception gate, both connected to one of the subscriber sets, at least one time division multiplex link, a plurality of pairs of first supplementary gates, respectively inserted between the multiplex link and the pairs of transmission and reception gates connected to the subscriber sets in a single group, means for actuating the first supplementary gates in synchronism with the corresponding transmission and reception gates, and means whereby, in the event of a fault in the transmission gate or reception gate connected to a subscriber set, the first transmission or reception supplementary gate corresponding to the group including said subscriber set is kept closed to transmit no signals for the whole duration of said fault, at least a first and a second analog/digital coder and decoder pair connected to said time division multiplex link so as to serve all the subscriber sets in common, the pairs of transmission and reception gates connected to the subscriber sets in a single group being connected in parallel to at least one first and one second pair of first supplementary gates which are in turn respectively connected to the first and the second coder and decoder pair, and means for actuating said supplementary gates in synchronism with the corresponding transmission and reception gates, whereby the coder and decoder pairs may be used simultaneously or alternatively.

* * * * *